United States Patent Office 3,507,752
Patented Apr. 21, 1970

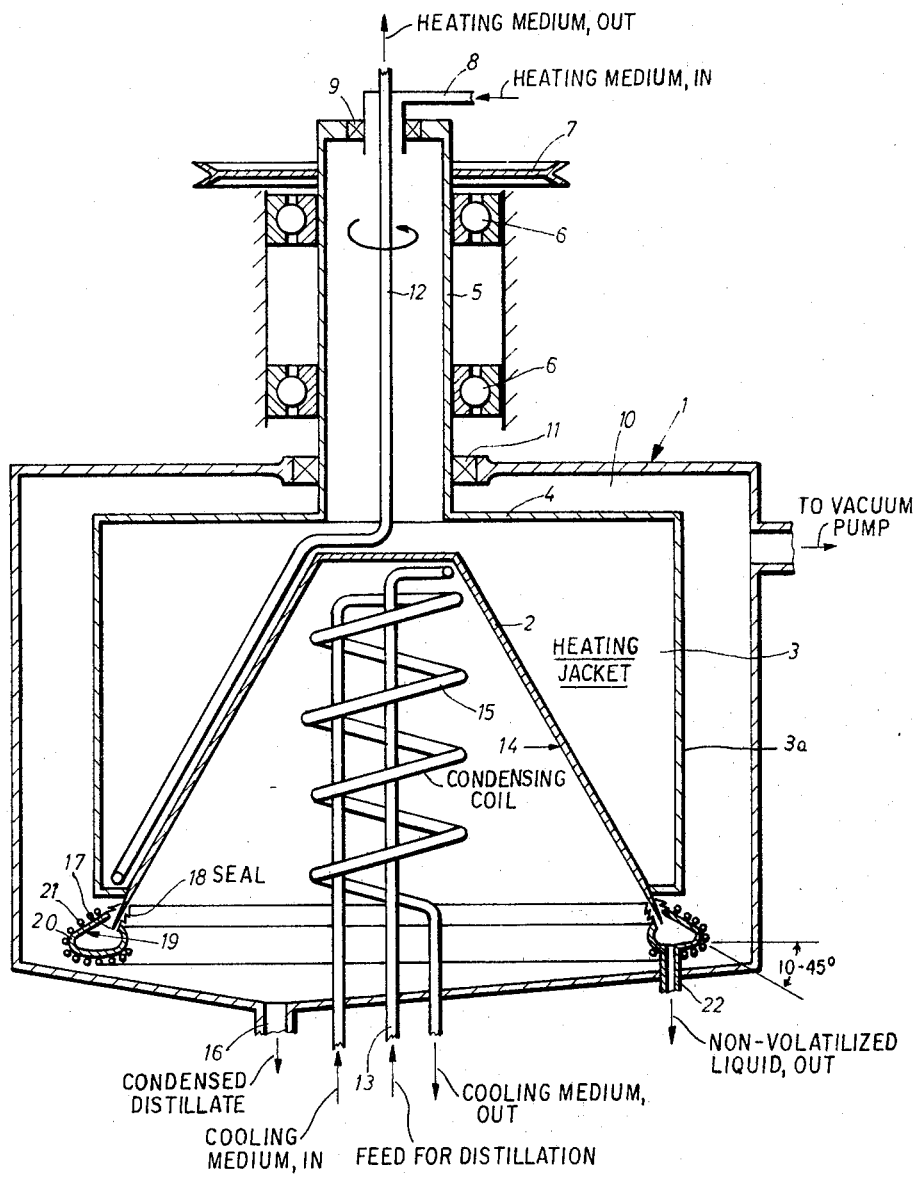

3,507,752
APPARATUS FOR HEAT-TREATING LIQUIDS
Rolf Germerdonk, Schildgen, Germany, assignor to Farbenfabriken Bayer Aktiengesellschaft, Leverkusen, Germany, a corporation of Germany
Filed Feb. 7, 1968, Ser. No. 703,645
Claims priority, application Germany, Feb. 21, 1967,
F 51,582
Int. Cl. B01d 1/22, 3/00
U.S. Cl. 202—187                                                   4 Claims

ABSTRACT OF THE DISCLOSURE

Apparatus for distilling liquids comprising a housing sealed off from the atmosphere in which there is a rotatably mounted conical surface having a jacket on the outwardly disposed side thereof mounted for rotation therewith. Drive means are provided for rotating the conical surface and the jacket, and means are provided for supplying a heating medium to the jacket and, in addition, means are provided for removing the heating medium from the jacket. A supply pipe for liquid to be distilled opens on the inside of the narrower end of the conical surface. A collecting trough is arranged opposite the wider end of the conical surface, and the wider end of the conical surface has a sharp edge deflecting ring disposed in the collecting trough. The collecting trough is provided with cooling means, and is sealed off from the conical surface by at least one labrinth seal. The deflecting rim forms at least one of the supporting surfaces for the labryinth seal.

---

This invention relates to a process and an apparatus for heat-treating, i.e. distilling, concentrating, etc. liquids, heat-sensitive liquids in particular, in which the liquid is delivered to the inner surface of the narrower end of a steam-heated rotating conical jacket, and is then spread out on the heating surface into a thin film, whilst the non-volatilised part of the liquid flows out to the widened edge of the conical jacket, the vapours being removed from the space surrounded by the conical jacket. The process according to the invention is carried out in an apparatus having a housing sealed off from the atmosphere containing a rotatably mounted conical jacket which is provided with drive means and is surrounded by a co-rotating heating zone, the arrangement being such that the supply pipe for the liquid opens on the inside of the narrower end of the conical jacket, whilst a collecting trough is arranged opposite the broadened edge of the conical jacket.

Process and apparatus of this kind are already known. Unfortunately, they have the disadvantage that the liquid to be heat-treated remains for too long in the high temperature zone, whilst, in particular, the non-volatilised liquid has to pass a relatively extended period of time before it can be brought out of the critical temperature zone by cooling.

Accordingly, the present invention relates to a process and an apparatus by means of which the liquid is exposed to the boiling temperature for only fractions of a second during its presence on the heating surface, whilst the non-volatilised liquid in particular can be immediately cooled again. The vapours formed may also be condensed immediately.

According to the invention, this object is achieved by cooling the non-volatilised part of the liquid as it leaves the heating surface of the conical jacket in a following collecting zone which is sealed off from the vapour zone and thus never comes into contact with it.

In one advantageous further embodiment of the process, heat treatment is carried out at pressure below 1 torr in order to protect the liquid. In this case, the vapours formed are condensed in the space surrounded by the conical jacket.

The apparatus for carrying out the process according to the invention is distinguished by the fact that the collecting channel is provided with cooling means and is sealed off from the conical jacket by means of at least one labyrinth seal.

As a result, the film of liquid sprayed off the heating surface is able to flow unimpeded into the collecting channel without any vapours from the evaporation zone penetrating into the collecting channel, where they would be condensed, further diluting the non-volatilised liquid and spoiling the separating effect obtained.

The widened end of the conical jacket is with advantage provided with a sharp-edged deflecting rim. This rim preferably forms at least one of the supporting surfaces for the labyrinth seal.

In another preferred embodiment, the collecting channel is inclined at an angle of between 10 and 45° C. towards the path followed by the droplets in the contact zone of the deflected non-volatilised liquid situated above the level of liquid collected. As a result, the impinging liquid is cooled in the form of a thin film on the cooled wall of the collecting channel, so that a particularly good cooling effect is obtained.

Cooling means are advantageously provided in the space surrounded by the conical jacket so that the vapours may immediately be condensed.

The process according to the invention and an embodiment of the apparatus are described by way of example below with reference to the accompanying drawing.

Referring now to the drawing, the apparatus comprises a housing 1, arranged in which is a rotating conical surface 2 outfitted with an outwardly disposed jacket 3a, providing the conical surface 2 with a co-rotating heating zone 3. The heating zone 3 has a wall 4 having joined thereto a tube 5 which is rotatably mounted in bearings 6 and provided with a pulley wheel 7. The tube 5 is sealed to the stationary supply pipe 8 for the heating medium by means of a seal 9. The vacuum zone 10 is sealed to the tube 5 by means of a seal 11. The reference 12 denotes a return pipe for the heating medium. The liquid to be concentrated by evaporation is fed through a pipe 13 which opens on the narrower end of the inside of the conical jacket 2. Due to centrifugal force, the liquid is distributed as a thin film over the heating surface 14 and volatilises. The vapours formed are condensed by the condenser coil 15 and collect at the bottom of the housing 1. The resulting condensate flows off through the pipe 16. The non-volatilised liquid flows off the deflecting edge 17 at the wider end of the conical jacket 2, having flowed beforehand through a labyrinth seal 18 without coming into contact with any of its peaks.

The liquid which flows off drops on to the contact zone 19 of the collecting channel where it is immediately cooled by a cooling means 21. Finally, the non-volatilised liquid is drained off through a pipe 22.

I claim:
1. Apparatus for distilling liquids comprising a housing a housing sealed off from the atmosphere in which there is rotatably mounted a conical surface having a jacket on the outwardly disposed side thereof mounted for rotation therewith, drive means for rotating the conical surface and the jacket, means for supplying a heating medium to said jacket and means for removing the heating medium from the jacket, a supply pipe for the liquid to be distilled, opening on the inside of the narrower end of the conical surface, and a collecting trough arranged opposite the wider end of the conical surface, the wider end of the conical surface having a sharp edge deflecting ring disposed in the collecting trough, the collecting trough being provided with cooling means and sealed off from the conical surface by means of at least one labryinth seal, the deflecting rim forming at least one of the supporting surfaces for the labyrinth seal.

2. Apparatus according to claim 1, and means for condensing distilled vapor, disposed within said conical surface.

3. Apparatus as claimed in claim 1, wherein the collecting trough is inclined at an angle of between 10° and 45° towards the path followed by the droplets in the contact zone of the deflected non-volatilised liquid situated above the level of the liquid collected.

4. Apparatus according to claim 3, and means for condensing distilled vapor, disposed within said conical surface.

References Cited

UNITED STATES PATENTS

| 2,349,431 | 5/1944 | Hickman | 202—205 |
| 2,343,667 | 3/1944 | Hickman | 202—205 |
| 2,364,360 | 12/1944 | Hickman | 202—205 |
| 2,538,967 | 1/1951 | Hickman | 202—205 |
| 2,408,639 | 10/1946 | Hickman | 203—23 |
| 2,855,345 | 10/1958 | Mares | 202—205 |

NORMAN YUDKOFF, Primary Examiner

J. SOFER, Assistant Examiner

U.S. Cl. X.R.

159—6, 13; 202—236, 238